US012149010B2

(12) United States Patent
Somersalo

(10) Patent No.: US 12,149,010 B2
(45) Date of Patent: Nov. 19, 2024

(54) STACKED MULTI-BAND ANTENNA

(71) Applicant: TEKNOLOGIAN TUTKIMUSKESKUS VTT OY, Espoo (FI)

(72) Inventor: Matti Somersalo, Vtt (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 0 days.

(21) Appl. No.: 18/553,294

(22) PCT Filed: Mar. 16, 2022

(86) PCT No.: PCT/FI2022/050168
§ 371 (c)(1),
(2) Date: Sep. 29, 2023

(87) PCT Pub. No.: WO2022/207969
PCT Pub. Date: Oct. 6, 2022

(65) Prior Publication Data

US 2024/0088566 A1 Mar. 14, 2024

(30) Foreign Application Priority Data

Mar. 31, 2021 (FI) ...................................... 20215390

(51) Int. Cl.
*H01Q 9/04* (2006.01)
*H01Q 1/28* (2006.01)
(Continued)

(52) U.S. Cl.
CPC ........... *H01Q 9/0414* (2013.01); *H01Q 1/288* (2013.01); *H01Q 1/38* (2013.01); *H01Q 1/50* (2013.01); *H01Q 19/108* (2013.01)

(58) Field of Classification Search
CPC ........ H01Q 9/0414; H01Q 1/288; H01Q 1/38; H01Q 1/50; H01Q 19/108
See application file for complete search history.

(56) References Cited

U.S. PATENT DOCUMENTS 5,394,163 A * 2/1995 Bullen .................. F41G 7/2246
343/700 R
5,485,167 A 1/1996 Wong et al.
(Continued)

FOREIGN PATENT DOCUMENTS

CN 110690551 A 1/2020
EP 2230715 A1 9/2010
(Continued)

OTHER PUBLICATIONS

Finnish Patent and Registration Office, Office Action for FI 20215390, dated Nov. 9, 2021, 6 pages.
(Continued)

*Primary Examiner* — David E Lotter
(74) *Attorney, Agent, or Firm* — Robert P. Michal, Esq.; Carter, DeLuca & Farrell LLP

(57) ABSTRACT

The present invention relates to an antenna stack comprising a ground plane and a plurality of antenna layers for separate operating frequency bands, the antenna stack comprising i) an antenna on one antenna layer and at least one antenna array on at least one different antenna layer or ii) at least two antenna arrays, each on a different antenna layer. Each individual antenna layer comprises an antenna or an antenna array that operates on a frequency band that is specific to the respective antenna layer and different from frequency band or bands of other antenna layer or layers. The antenna layer comprises antenna elements manufactured by patterning conductor material on a respective flexible and/or bendable sheet of insulating material. Antenna elements on the respective antenna layer is a circularly polarized crossed dipole
(Continued)

antenna element or a crossed dipole antenna element that is electrically configurable into circularly polarized or linearly polarized configuration. Each antenna layer has a predefined distance from the ground plane, wherein the predefined distance between the antenna or antenna array comprised on the respective antenna layer and the ground plane is defined based of the frequency band of the respective antenna or antenna array.

19 Claims, 10 Drawing Sheets

(51) Int. Cl.

| | |
|---|---|
| ***H01Q 1/38*** | (2006.01) |
| ***H01Q 1/50*** | (2006.01) |
| ***H01Q 19/10*** | (2006.01) |

(56) References Cited

U.S. PATENT DOCUMENTS

| | | | | |
|---|---|---|---|---|
| 6,211,841 | B1 | 4/2001 | Smith et al. | |
| 6,452,549 | B1 | 9/2002 | Lo | |
| 10,756,412 | B1 | 8/2020 | Zekios et al. | |
| 2007/0200763 | A1 | 8/2007 | Allen et al. | |
| 2010/0231479 | A1 * | 9/2010 | Hauhe | H01Q 25/008 343/810 |
| 2015/0077292 | A1 | 3/2015 | Kalistaja | |
| 2016/0352003 | A1 | 12/2016 | Puente et al. | |
| 2018/0151938 | A1 | 5/2018 | Rudys et al. | |

FOREIGN PATENT DOCUMENTS

| | | | |
|---|---|---|---|
| WO | 2020159902 | A1 | 8/2020 |
| WO | 2020225482 | A1 | 11/2020 |

OTHER PUBLICATIONS

European Patent Office, International Search Report and Written Opinion of the International Searching Authority for PCT/FI2022/050168, mailed Jun. 22, 2022, 12 pages.

Mao, Chun-Xu, et al., “Low-Cost X/Ku/Ka-Band Dual Polarized Array With Shared Aperture”, IEEE Transactions on Antennas and Propagation, vol. 65, No. 7, Jul. 2017, pp. 3520-3527.

* cited by examiner

STACKED MULTI-BAND ANTENNA

CROSS-REFERENCE TO RELATED APPLICATIONS

The present application is a U.S. national stage application of International Application No. PCT/FI2022/050168, filed Mar. 16, 2022, which claims priority to and the benefit of Finnish Application No. FI 20215390, filed Mar. 31, 2021, the contents of which are incorporated herein by reference and made a part hereof.

FIELD

The present invention relates to an antenna apparatus. More particularly, the invention relates to a stacked multi-band antenna with crossed dipole antenna elements.

BACKGROUND

Artificial satellites, often referred to shortly just as satellites, ad objects that have been intentionally placed into orbit. Satellites are used for many purposes. Among several other applications, they can be used to make star maps and maps of planetary surfaces, and also take pictures of planets they are launched into. Common types include military and civilian Earth observation satellites, communications satellites, navigation satellites, weather satellites, and space telescopes. Satellites are typically launched using a rocket that takes the satellite into orbit.

Also unmanned aerial vehicles (UAVs), commonly referred to as drones, typically need good communication capabilities, but area and weight of communication apparatus, including the antennas is restricted.

A satellite typically needs good wireless communication capabilities for transferring information between the satellite and a ground station. Likewise, UAVs need good wireless communication capabilities for facilitating both remote control and transfer of information. Circular polarization is often preferred for satellite and UAV antennas, since circular polarization is not as sensitive to mutual orientation of the satellite and the ground station antennas as other polarization types. A typical satellite communication operates on 5G microwave and/or millimeter wave frequencies. Higher microwave frequencies with short wavelengths can be handled with small antennas that fit on the satellite's body. Current invention is related in particular to antennas for lower end of the 5G microwave frequencies, such as lower end of the UHF-band with sub 1 GHz frequencies, so called L-band (1 GHz to 2 GHz), S-band (2 GHz to 4 GHz) and C-band (4 Ghz to 8 GHz), with center frequencies of 1.25 GHz, 2.5 GHz, and 5 GHz respectively, which have wavelengths that are long in comparison to size of a body of a miniature satellite. The miniature cube satellite, as known in the art, is made of cubes with side length of 10 cm, with a size limit set to the entire satellite having no more than 16 cube units for enabling cost-efficient transportation of the satellite into orbit. When the cubes are arranged to a 2×2×4 cube satellite body, the available space of one satellite side is 20×40 cm. Thus, an L-band antenna is quite big in comparison to such cube, with its 24 cm long wavelength in air. Thus, a maximum 2×4 element L-band antenna array would fully occupy the whole satellite surface with 0.4λ element spacing leaving no space for the S- and C-band antenna arrays. Thus, due to limited surface area, it is not possible to manufacture individual antenna arrays side by side on one satellite face.

A way around the space limitations of the satellite body is to make the antennas such that they can be folded and packed inside the satellite body and deployed after the satellite is in orbit by unfolding the antenna outside the satellite body.

DESCRIPTION OF THE RELATED ART

Patent application WO 2020/225482 A1 "An antenna element and an antenna array for wireless communication systems" discloses an antenna or antenna array with feeds printed on two sides of the film and feeds are cut out to the film and bent to the ground plane. The structure is extremely light weight and scalable through the required frequency ranges.

Patent application US20150077292 A1 discloses a thin and cost-effective three-dimensional antenna assembly for small form-factor portable radio devices.

Patent application EP2230715 A1 discloses a lightweight stowable phase array lens antenna assembly.

Patent application US20160352003 A1 discloses a slim triple band antenna array arrangement, in which radiation elements operating on different frequencies are interlaced, but not overlapping.

Patent U.S. Pat. No. 6,452,549 B1 discloses a stacked, multi-band see-through antenna with a rear high-frequency antenna formed as a mesh pattern and front low-frequency antenna. Foam spacers separate layers of the structure.

SUMMARY

An object is to provide an apparatus so as to solve the problem of providing a foldable and/or rollable multi-band antenna. The objects of the present invention are achieved with an apparatus according to the characterizing portion of claim 1.

The preferred embodiments of the invention are disclosed in the dependent claims.

The present invention is based on the idea of stacking antennas and antenna arrays operating on different bands into a foldable and/or rollable, extremely lightweight structure that can be packed inside the satellite or UAV body. In satellite use, the antenna stack can be unfolded/unrolled after the satellite is in orbit, which decreases volume of the satellite during transport and thus deployment cost.

According to a first aspect, an antenna stack comprising a ground plane and a plurality of antenna layers is provided. The antenna stack comprises i) an antenna on one antenna layer and at least one antenna array on at least one different antenna layer or ii) at least two antenna arrays, each on a different antenna layer. Each individual antenna layer comprises an antenna or an antenna array that operates on a frequency band that is specific to the respective antenna layer and different from frequency band or bands of other antenna layer or layers. The antenna layer comprises antenna elements manufactured by patterning conductor material on a respective flexible and/or bendable sheet of insulating material. Each antenna element on the respective antenna layer is a circularly polarized crossed dipole antenna element or a crossed dipole antenna element that is electrically configurable into a circularly polarized or linearly polarized configuration. Each antenna layer has a predefined distance from the ground plane, wherein the predefined distance between the antenna or antenna array comprised on the respective antenna layer and the ground plane is defined based of the frequency band of the respective antenna or antenna array.

According to a second aspect, all antenna elements comprised on the same antenna layer are mutually similar.

According to a third aspect, the antenna layers are separated from each other by a non-zero distance and wherein the volume between superimposed antenna layers is filled by a gas, vacuum and/or any supporting structure and/or substrate that can be folded and/or used as a folding mechanism of the stacked antenna.

According to a fourth aspect, each antenna element is fed by a respective antenna feed patterned on a feed portion of the respective sheet of insulating material, the feed portion comprising a conductor material pattern forming two antenna feed lines on a first face of the feed portion, wherein the feed portion is partially cut out from the respective flexible and/or bendable sheet of insulating material of the respective antenna layer and wherein one of the antenna feed lines is attached to the ground plane and other one of the antenna feed lines is coupled to a radio frequency signal feed on the ground plane.

According to a fifth aspect, the feed portion further comprises a contiguous ground layer or a plurality of conductive patches formed on a second face of the feed portion that is opposite to the first face of the feed portion.

According to a sixth aspect, a/the antenna feed/feeds of an antenna layer that is/are not directly superimposed on the ground plane passes/pass through respective sheet or sheets of insulating material of any intermediate antenna layers, to reach the ground plane.

According to a seventh aspect, the antenna arrays are arranged according to increasing wavelength, shortest wavelength closest to the ground plane and longest wavelength furthest away from the ground plane.

According to an eighth aspect, distance between the ground plane and each antenna layer is equal or comparable to quarter of the wavelength of the center frequency of the antenna elements on the respective antenna layer.

According to a ninth aspect, the antenna layers are parallel with the ground plane.

According to a tenth aspect, dipole antenna elements on each two adjacent superimposed antenna layers are rotated 45 degrees with respect to each other.

According to an eleventh aspect, each antenna element of the respective antenna or antenna array comprises a) a crossed dipole antenna element comprising two electrically separate, mutually crossed dipoles on two opposite faces of the sheet of insulating material and two antenna feeds for individually feeding the two dipoles, wherein the crossed dipole antenna element is configurable into a circularly polarized antenna by feeding the two crossed dipoles with a 90 degree phase difference and the crossed dipole element is configurable into a linearly polarized configuration by feeding the two crossed dipoles separately to obtain dual linear polarization, or feeding just one of the crossed dipoles for single linear polarization, or b) a circularly polarized crossed dipole antenna element comprising two mutually crossed dipoles on the same face of the sheet of insulating material and a single antenna feed, wherein a first dipole is directly coupled to the antenna feed and the second dipole is coupled to the antenna feed via phasing connection lines formed on the respective antenna layer for causing the respective second dipole to be fed in 90 degrees phase with respect to the first dipole.

According to a twelfth aspect, the antennas or antenna arrays on different antenna layers are configured to be used in time division, so that the antenna or the antenna array on a single antenna layer is active at a time.

According to a thirteenth aspect, the at least two different frequency bands are selected from UHF band with frequency band below 1 GHz, L-band with frequency band between 1 and 2 GHz, S-band with frequency band between 2 and 4 GHz, and C-band with frequency band between 4 and 8 GHz.

According to a fourteenth aspect, a relation between center frequencies of antenna or antenna array on two superimposed antenna layers is approximately 1:2, so that the center frequency of the antenna layer that that is closer to the ground plane is higher.

According to a fifteenth aspect, the antenna stack is foldable and/or rollable for transport and unfoldable and/or unrollable for operation.

According to another aspect, an antenna stack according to any one of the above aspects is used in a satellite.

The present invention has the advantage that it reduces volume and surface area of the satellite or UAV needed for the antenna, provides a very lightweight and cost-effective solution that is easy to incorporate into the limited space available in a satellite, and facilitates high quality wireless communication using circular polarization on multiple frequency bands. Antenna layers are also easy and cost-effective to manufacture, for example using roll-to-roll printing.

BRIEF DESCRIPTION OF THE DRAWINGS

In the following the invention will be described in greater detail, in connection with preferred embodiments, with reference to the attached drawings, in which.

DETAILED DESCRIPTION

Figure 1:
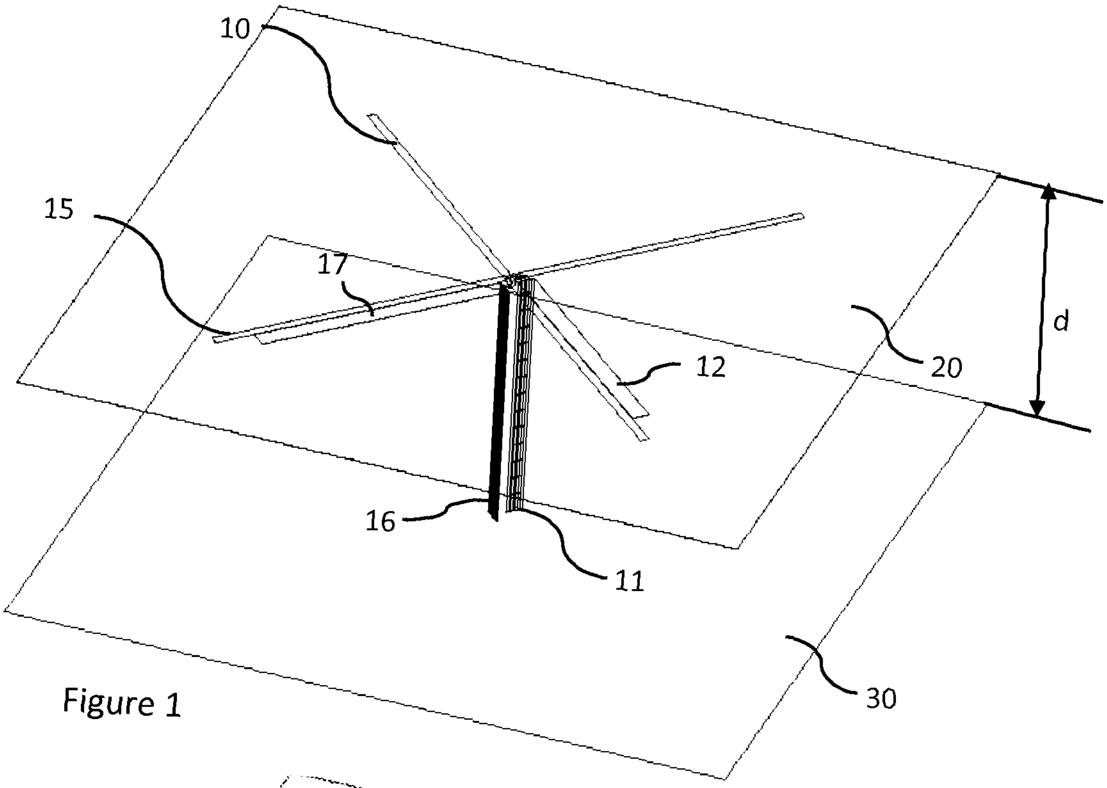
FIG. 1 illustrates a first crossed dipole antenna element design

The FIG. 1 illustrates a first crossed dipole antenna element design. Two mutually crossed dipole elements (10, 15) are formed out of conductor material on an insulating sheet. Any applicable type of known conductor material can be used that can be patterned on the insulating sheet. Conductor material may be for example metal, such as copper, silver, aluminum and/or gold, metal based conductor, such as printable silver paste, as well as non-metallic conductor such as graphite or conductive polymer. Material of the insulating sheet should be light, bendable and/or flexible. Non-limiting examples of suitable the insulating sheet materials are polyethylene terephthalate (PET) and Kapton™ Kapton is a commonly utilized polyimide material used in flexible printed circuits. Alternatively, any other suitable plastic material may be used. Preferably, the two dipoles of this crossed dipole design are formed on different sides of the insulating sheet. Term antenna layer refers to a layer having non-zero thickness, wherein the antenna layer comprises the insulating sheet and dipole elements on one or two sides of the insulating sheet.

In the first crossed dipole antenna element design, each dipole is provided with its own antenna feed (11, 16). The antenna feed is initially manufactured on the same insulating sheet as the dipole antenna element. The insulating sheet is then partially cut out (12, 17) about the antenna feed so that the antenna element remains in contact with the respective dipole element, and the antenna feed is bent away from the antenna layer towards a ground plane (30) that resides below the antenna layer (20). The antenna feeds (11, 16) are connected to radio frequency feed lines (not shown), which may be arranged on the ground plane. Antenna feeds are relatively long and thin, and length of the antenna feeds equals a wanted distance between the ground plane (30) and the antenna layer (20). The ground plane and the antenna layer are preferably parallel, both extending in direction of the xy-plane with a vertical distance (d) in the z-axis direction between the antenna layer and the ground plane is preferably approximately equal to one quarter of the wavelength at the center frequency of the respective antenna elements on the antenna layer (20).

The crossed dipole is fed with two feeding lines, i.e. both dipoles are fed individually with isolation between the dipole feed ports. This configuration makes it possible to use the antenna element in different operation modes: single linear, dual linear, left-handed circular polarization, or right-handed circular polarization, depending on how the inputs are phased or connected to each other at the base board. For circular polarization, the ports should be excited with 90-degree phase difference.

Figure 2:
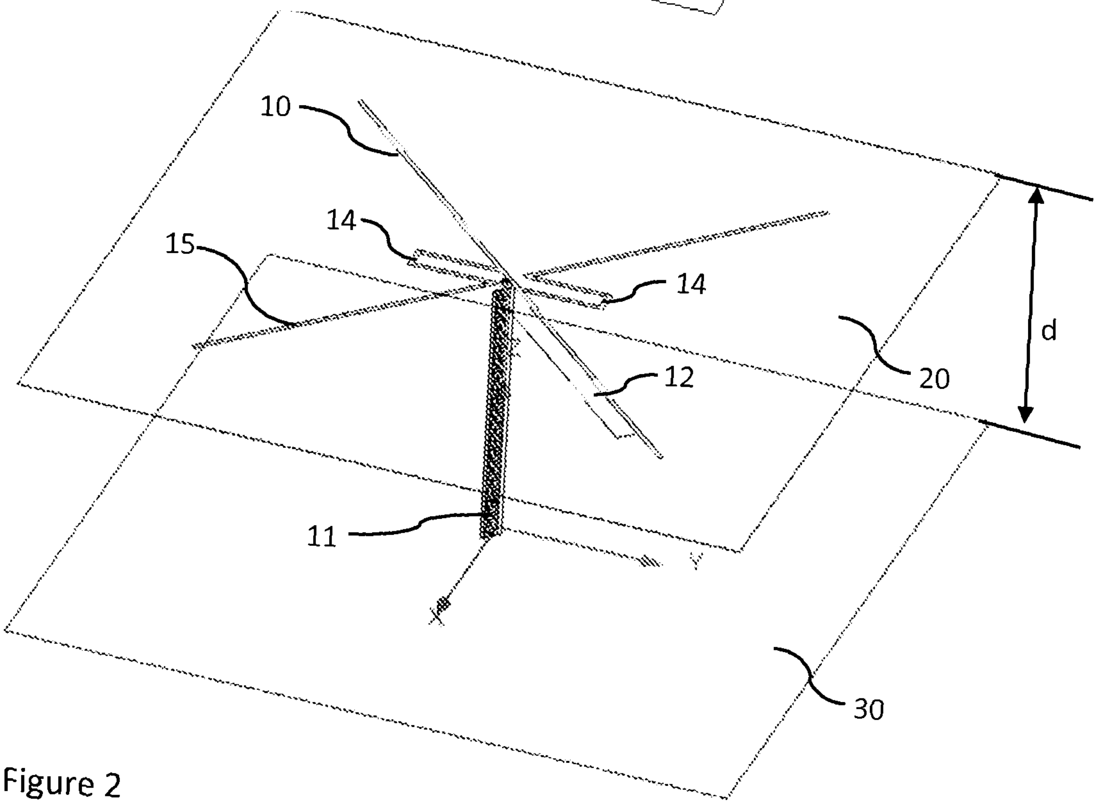
FIG. 2 illustrates a second crossed dipole antenna element design

The FIG. 2 illustrates a second crossed dipole antenna element design. Like in the above design, the two mutually crossed dipole elements (10, 15) are formed out of conductor material on the insulating sheet. The two dipoles of this crossed dipole design are formed the same side of the insulating sheet so that they are mutually coupled.

In the second crossed dipole antenna element design, only one antenna feed (11) is provided for feeding both dipole elements. The antenna feed is initially manufactured on the same insulating sheet as the dipole antenna element. The insulating sheet is then partially cut out (12) about the antenna feed so that the antenna element remains in contact with the respective dipole element, and the antenna feed is bent away from the antenna layer towards a ground plane (30) that resides below the antenna layer (20). The antenna feed (11) is connected to radio frequency feed lines (not shown), which may be arranged on the ground plane. Antenna feed is relatively long and thin, and length of the antenna feeds equals a wanted distance between the ground plane (30) and the antenna layer (20). The ground plane and the antenna layer are preferably parallel, both extending in direction of the xy-plane with a vertical distance (d) in the z-axis direction between the antenna layer and the ground plane is preferably approximately one quarter of the wavelength on the center frequency of the antenna elements on the respective antenna layer.

While the antenna feed is directly coupled to just one dipole's arms, the other dipole's arms are connected to the antenna feed with delay lines (14) for exciting the second dipole with a 90-degree phase difference to obtain circular polarization. Circular polarization direction, also referred to as "handedness", indicating whether there is left-handed circular polarization or right-handed circular polarization, depends on to which direction delay lines (14) are connected starting from the excited arm. For example, two dipoles may be coupled with delay lines to achieve circular polarization as disclosed in the patent application F120215020, which is incorporated herein by reference.

Some practical design considerations affect selection between the first and second crossed dipole antenna designs. The first design is configurable between linear and circular polarization, but on the other hand, configuration needs to be facilitated by enhanced and more complicated signal processing, typically by digital signal processing circuitry, which consumes more energy. The first design can be configured to linearly polarized configuration by feeding the two crossed dipoles separately to obtain dual linear polarization or feeding only one of the crossed dipoles for single linear polarization. The second design always has circular polarization but has somewhat narrower bandwidth. First design allows changing handedness of the circular polarization by mutually switching antenna feed's signal and ground connections while the second has fixed polarization. Here the handedness is defined by the connection line arrangement of the dipole arms. This is further discussed in connection to the FIGS. 15*a* and 15*b*.

Ground plane of the structure may comprise a sheet of the insulating material with a metal coating. Alternatively, a metal cover of an apparatus, such as a metal cover of a satellite cube or several satellite cubes, or a (portion of) metal body or other metal part of an UAV may be used as the ground plane for the antennas. Also, a combination of the metal cover of the apparatus and a sheet of the insulating material with metal coating of the satellite cube(s) and/or and UAV body can be utilized as the antenna ground plane.

Figure 3A:
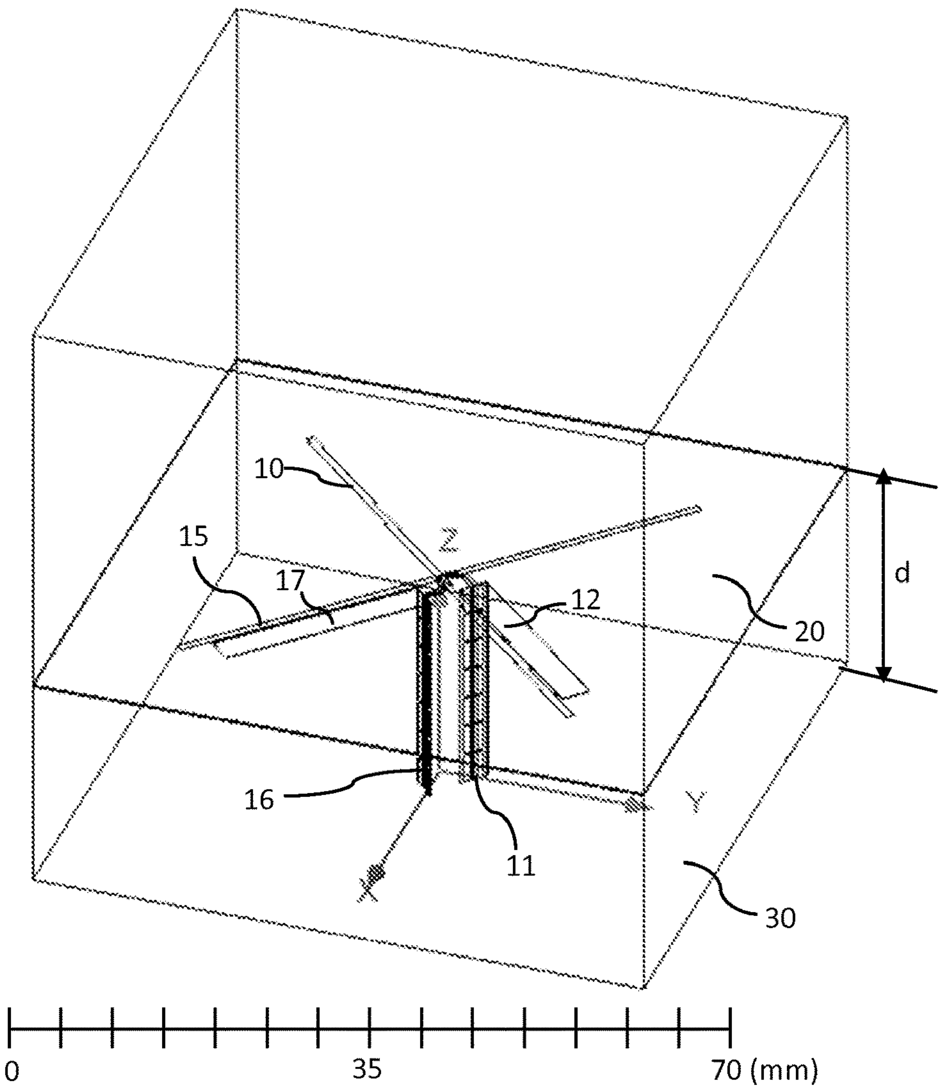
FIG. 3*a* illustrates a simulation model of a single crossed dipole antenna element
Figure 4:
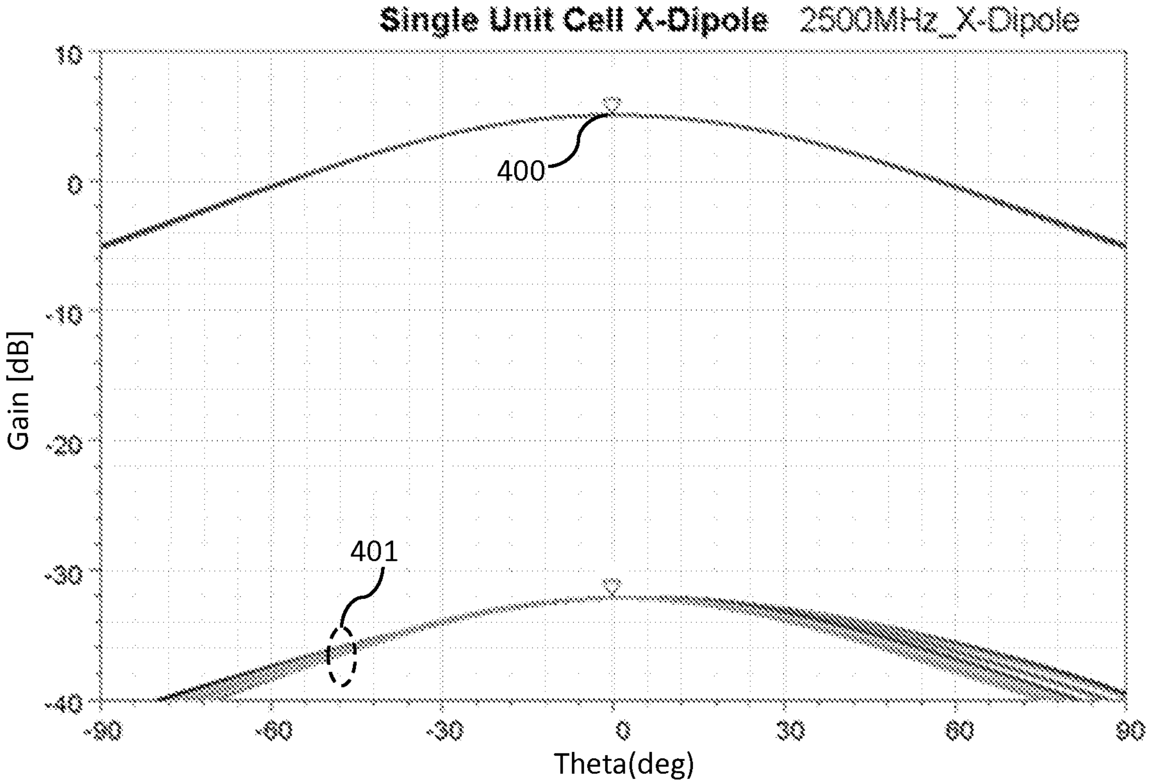
FIG. 4 illustrates gain of a crossed dipole antenna element
Figure 5:
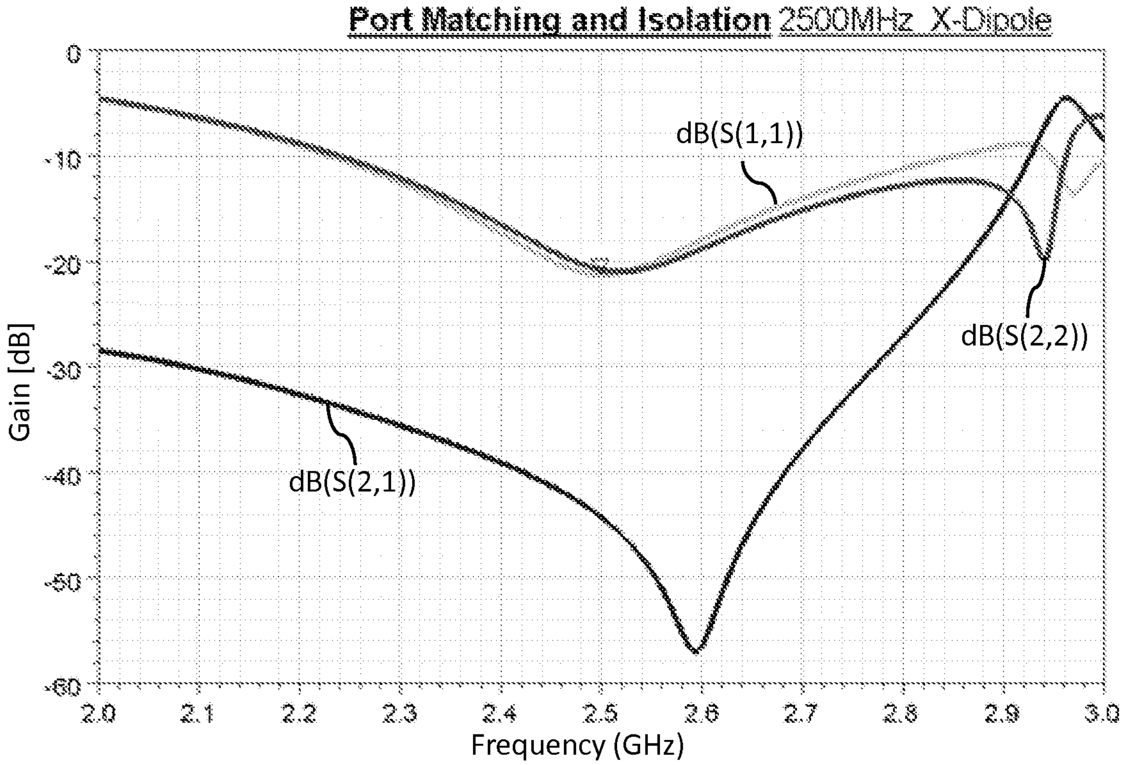
FIG. 5 illustrates port matching and isolation of a crossed dipole antenna element

FIG. 3*a* illustrates a simulation model of a single crossed dipole antenna element having the first crossed dipole antenna element design as shown in the FIG. 1, that was used for simulating electromagnetic behaviour of a crossed dipole antenna element. In this example, the crossed dipole operating at S-band, with 2.5 GHz center frequency on a flexible insulator sheet was first simulated within an infinite unit cell antenna array. The single crossed dipole antenna element has a cell gain of 5 dBi, as illustrated in the FIG. 4, which shows gain of the single, right-handed crossed dipole antenna element of FIG. 3*a* as a function of θ with different values of cp. The upper curve (400) indicates gain with $\varphi=0$ degrees, while the bunch of curves (401) indicate gain with $\varphi=15$, 30, 45, 60 and 75 degrees. FIG. 5 illustrates port matching and isolation of the same right-handed crossed dipole antenna element of FIG. 3*a*.

Figure 3B:
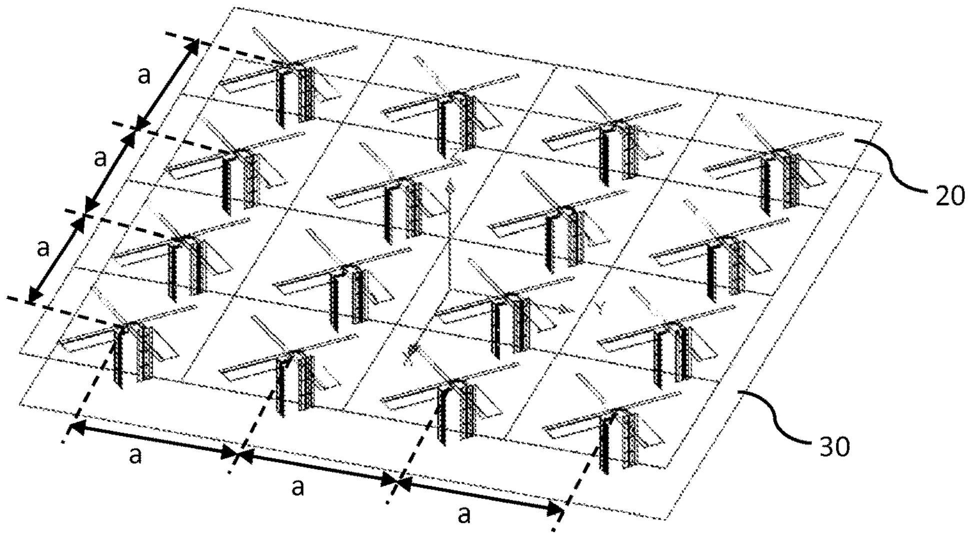
FIG. 3*b* illustrates an array of S-band crossed dipole antenna elements
Figure 6:
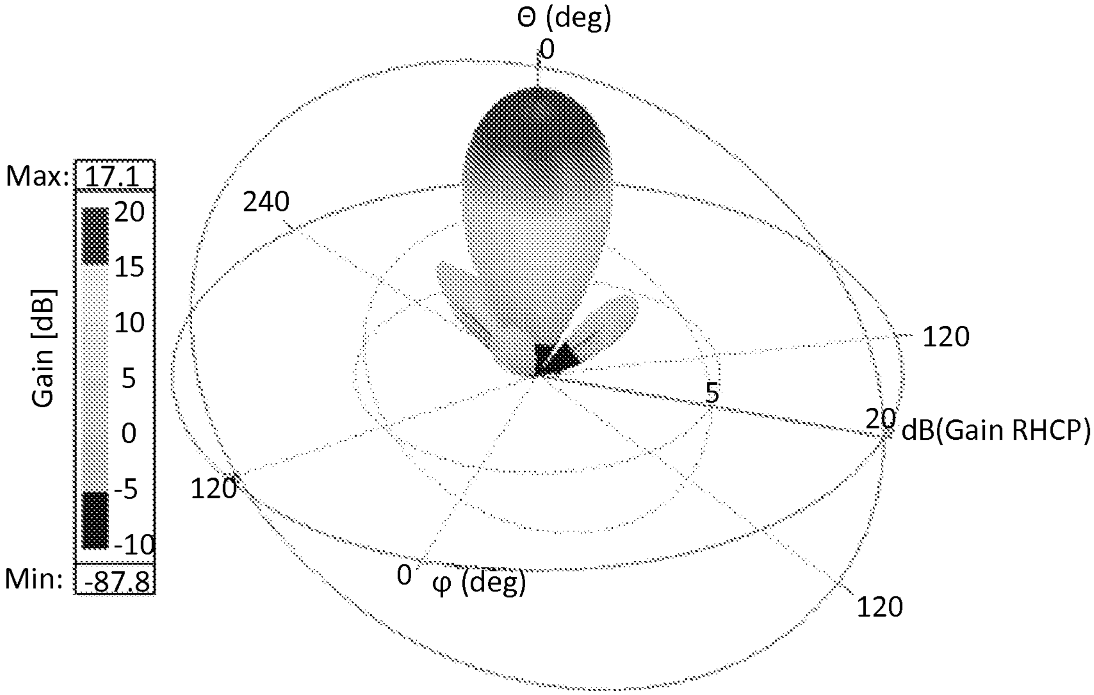
FIG. 6 illustrates simulated 3D antenna pattern of an antenna array

FIG. 3*b* illustrates a 4×4 array of S-band crossed dipole antenna elements of FIG. 3*a*, having a distance a of approximately 6 cm between the antenna elements, that was further simulated. Simulation results of the antenna array are illustrated in the FIGS. 6 and 7.

TABLE 1

| Measurement point | Theta (θ) | Gain (dB) |
|---|---|---|
| m1 | 0.0 | 17.1 |
| m2 | 0.0 | −20.0 |
| m3 | 12.1 | 14.1 |
| m4 | −12.1 | 14.2 |

Figure 7:
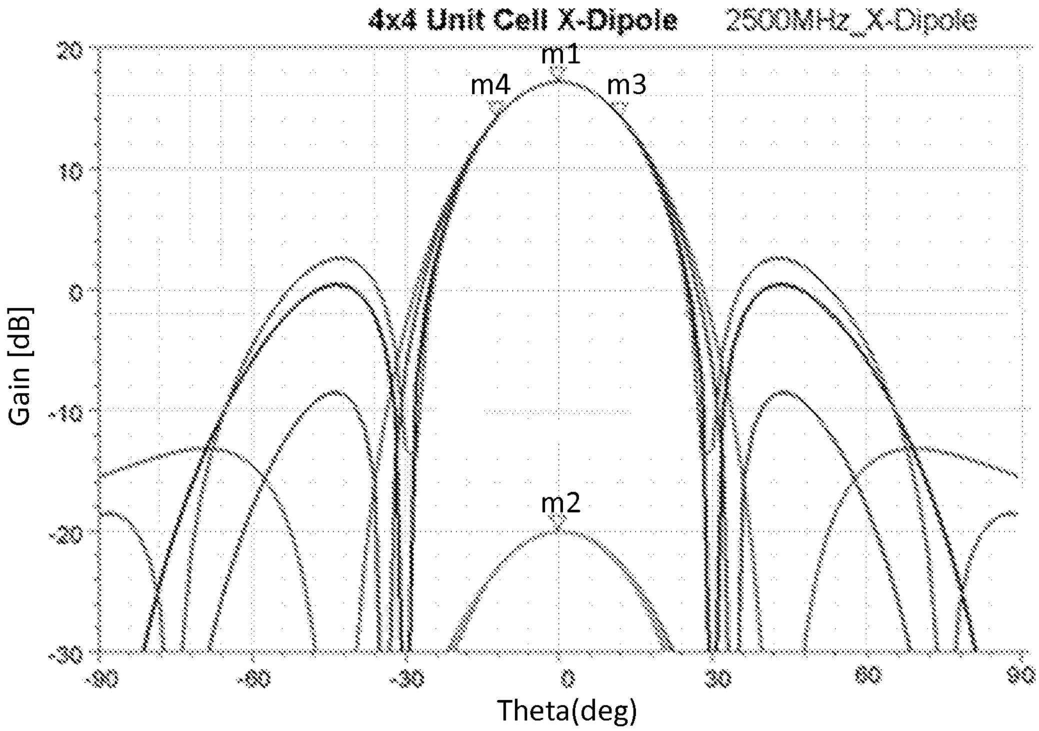
FIG. 7 illustrates simulated 2D antenna pattern of an antenna array

Table 1 shows some key measurement values in the FIG. 7. This antenna array has gain of about 17 dB, and the 3 dB bandwidth is about +/−12 degrees. Port isolation of the element calculated as a difference between measurement points m1 and m2 is over 35 dB. Axial ratio measured with ports that are fed with the same amplifier and with 90 degrees phase difference is 0.3+/−0.05 dB over −90<8<90 degrees with all φ values.

An antenna array with the second crossed dipole antenna element design has somewhat narrower bandwidth.

Size of a single half-wavelength crossed dipole antenna element on the antenna layer is about 4×4 cm, wavelength at the center frequency is approximately 12 cm and distance (a) between feeding points of adjacent antennas is preferably at least half of the wavelength, which is in this case 6 cm. Distance a can be measured between centers of adjacent crossed dipole antenna elements as illustrated in the FIG. 3*b*. Each crossed dipole antenna element of the array is on the same antenna layer. Thus, approximate minimum size of the 4×4 antenna array is 25×25 cm. As with any antenna array, gain of the array can be increased by increasing distance (a) between adjacent antenna elements and thus also the total size (area) of the antenna array and the antenna layer. Simulations show that the crossed dipole antenna element's axial ratio is good even at low elevation angles.

Figure 8A:
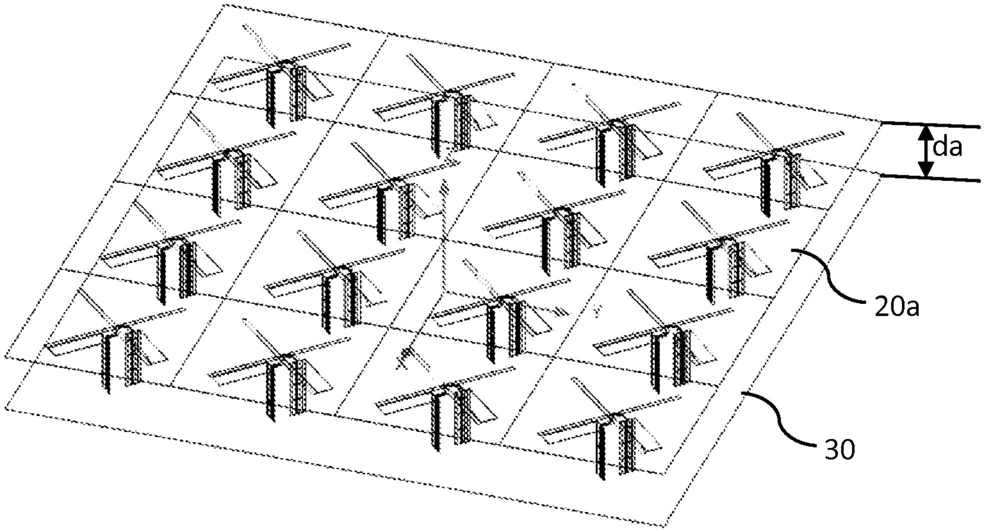
FIGS. 8*a* to 8*d* illustrate structure of a first antenna stack
Figure 8B:
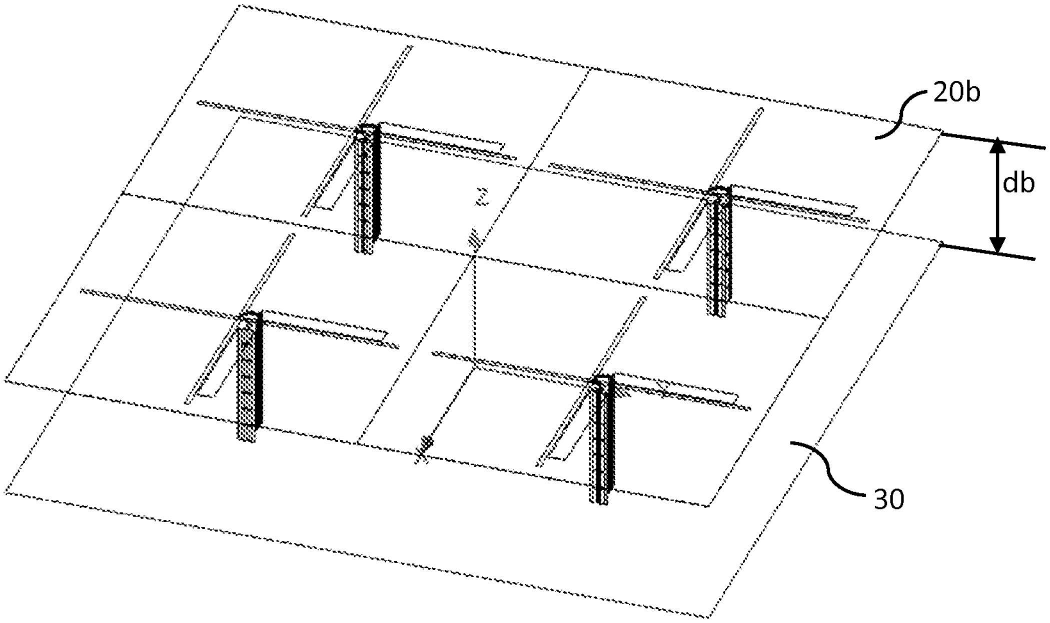
Figure 8C:
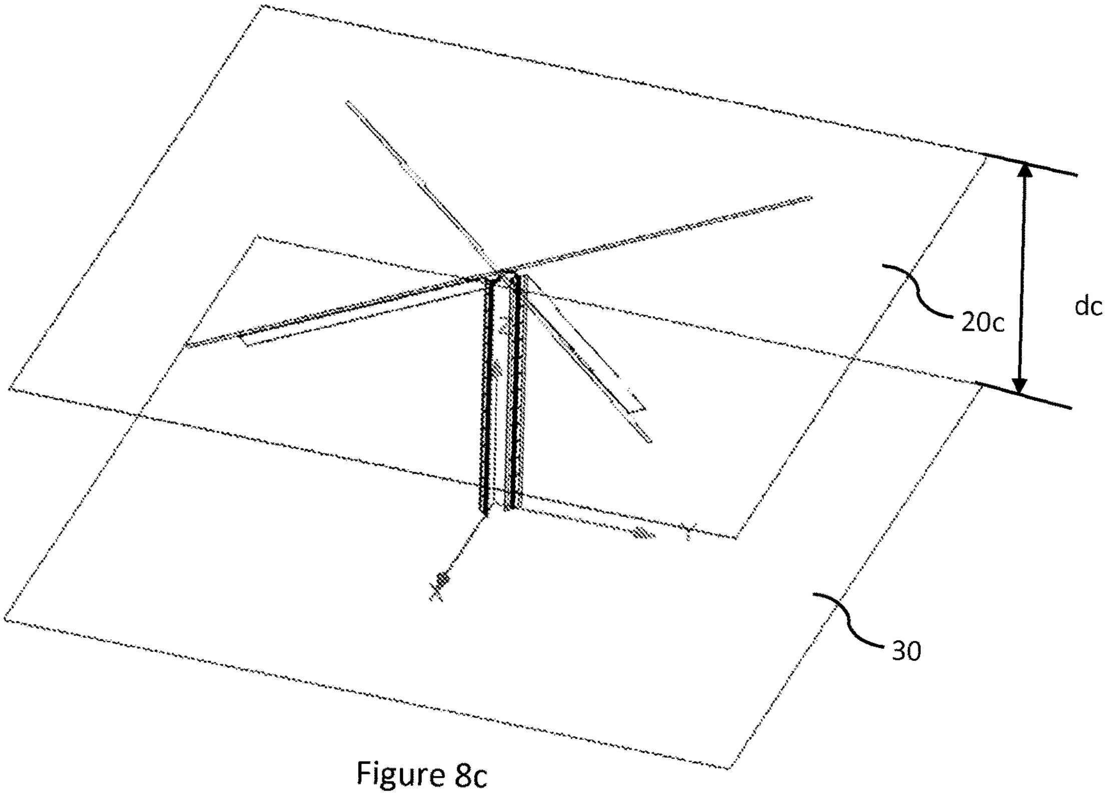
Figure 8D:
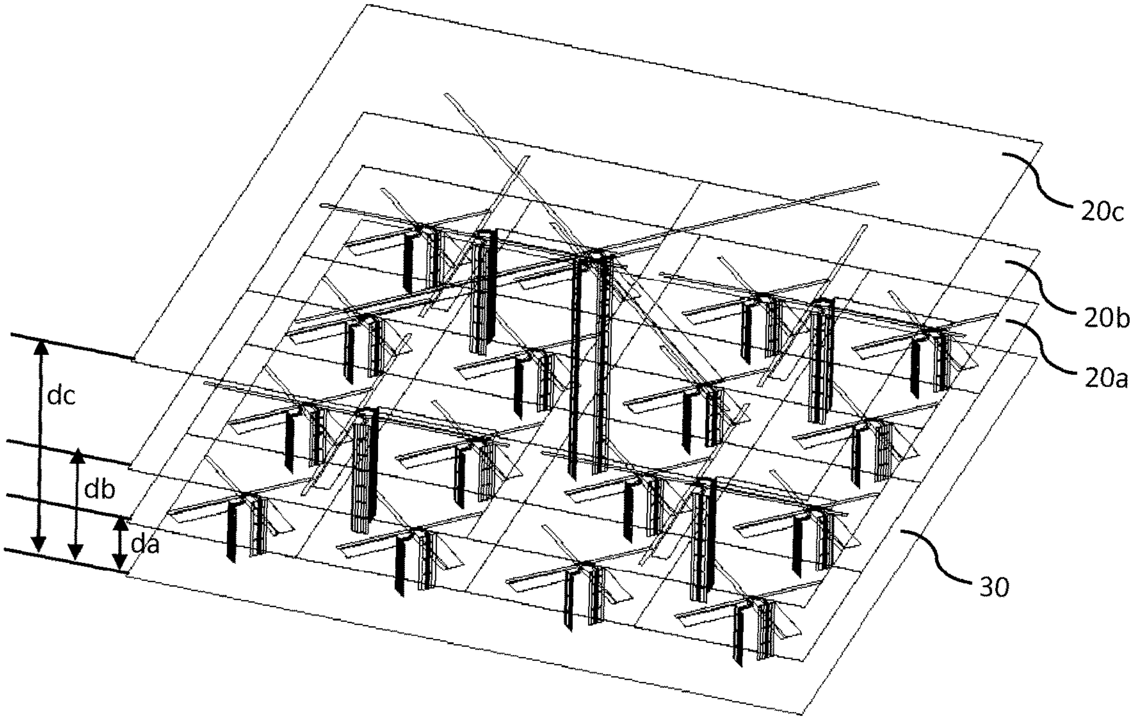

FIGS. 8*a* to 8*d* illustrate structure of an antenna stack according to a first embodiment of the present invention. Antenna elements are implemented using the first crossed dipole antenna element design, but alternatively, the second crossed dipole antenna element design may be used. For clarity, FIGS. 8*a*, 8*b* and 8*c* show each antenna layer separately, and FIG. 8*d* shows the antenna stack comprising the three antenna layers (20*a*, 20*b*, 20*c*) and a ground plane (30) combined. FIG. 8*a* shows a 4×4 antenna array operating on the C-band, with the crossed dipole antenna elements arranged on a first antenna layer (20*a*) and having a first distance (da) between the ground plane (30) and the first antenna layer (20*a*). The first distance (da) between the first antenna layer (20*a*) and the ground plane (30) is preferably about one quarter of the wavelength of the center frequency of the antenna elements on the first antenna layer (20*a*). FIG. 8*b* shows a 2×2 antenna array operating on the S-band, with the crossed dipole antenna elements arranged on a second antenna layer (20*b*) and having a second distance (db) between the ground plane (30) and the second antenna layer (20*b*). The second distance (db) between the second antenna layer (20*b*) and the ground plane (30) is preferably about one quarter of the wavelength of the center frequency of the antenna elements on the second antenna layer (20*b*). The FIG. 8*c* shows a single L-band antenna, with the crossed dipole antenna element arranged on a third antenna layer (20*c*) and having a third distance (dc) between the ground plane (30) and the third antenna layer (20*c*). The third distance (dc) between the third antenna layer (20*c*) and the ground plane (30) is preferably about one quarter of the wavelength of the center frequency of the antenna elements on the third antenna layer (20*c*). Antenna feeds are all connected to the same ground plane (30). FIG. 8*d* illustrates the structure of an antenna stack according to the invention, that comprises the three antenna layers (20*a*, 20*b*, 20*c*) and one shared ground plane (30). Antenna feeds of upper antenna layers further away from the ground plane (30) travel through the insulating material of any intermediate antenna layers between the antenna elements on the respective intermediate layers. Distance (d) between antenna elements leaves for a hole or holes in the intermediate antenna layers for bringing the antenna feeds through. Distance between the ground plane (30) and the respective antenna layer (20*a*, 20*b*, 20*c*) is the greater, the longer the center wavelength of the antenna elements on the respective antenna layer in order to obtain optimal impedance bandwidth and mirror antenna reflection at the ground plane. Preferably, distances (da, db, dc) between the antenna layers (20*a*, 20*b*, 20*c*) and the ground plane (30) are approximately one quarter of the wavelength on the center frequency of the antenna elements on the respective antenna layer, which causes the direct and reflected radiation fields to be in the same phase and thus amplifying each other.

Figure 9:
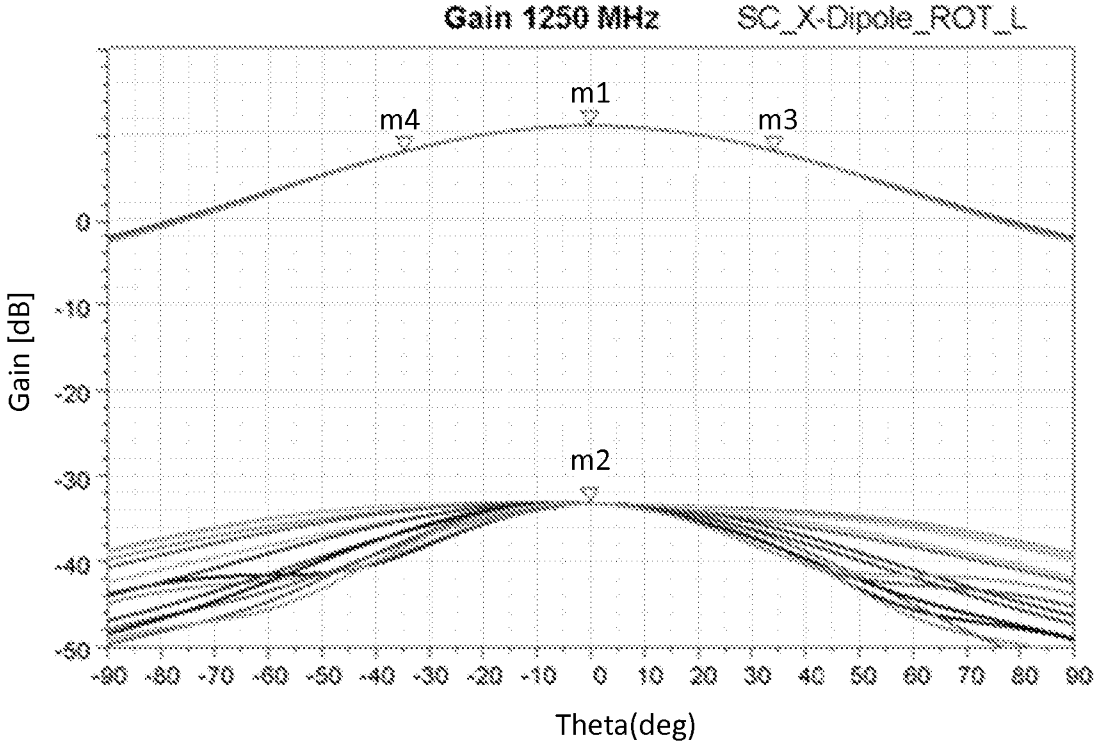
FIG. 9 illustrates gain in L-band

FIG. 9 illustrates gain of the left-handed L-band antenna on the antenna layer 20*c* of the antenna stack shown in the FIG. 8*d*, with a center frequency of 1.25 GHz. Table 2 shows some key measurement values in the FIG. 9. Measurement points m1 represents gain on the center frequency 1.25 GHz with θ=0 degrees and φ=0 degrees, and m3 and m4 represent approximate 3 dB points, which give a 3 dB bandwidth of about +/−35 degrees. Measurement point m2 illustrates gain with θ values deviating from 0 degrees. Port isolation calculated as a difference between measurement points m1 and m2 is about 44 dB.

TABLE 2

| Measurement point | Theta (θ) | Gain (dB) |
|---|---|---|
| m1 | 0.0 | 10.8 |
| m2 | 0.0 | −33.2 |
| m3 | 34.5 | 7.8 |
| m4 | −34.5 | 7.8 |

Figure 10:
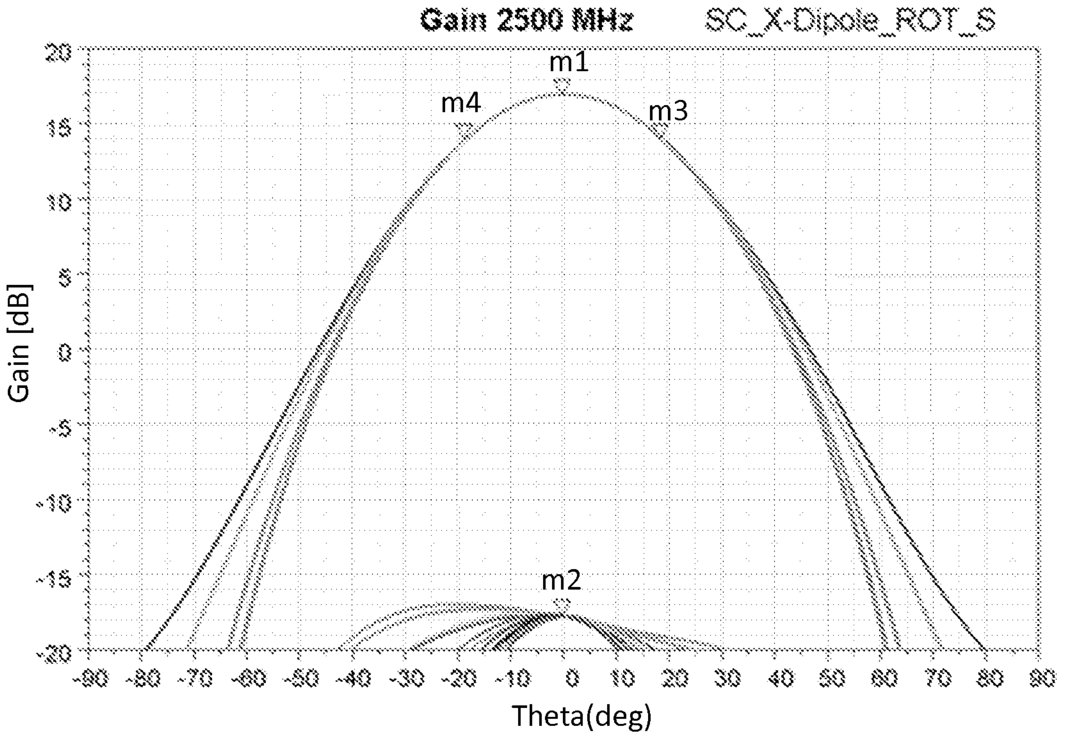
FIG. 10 illustrates gain in S-band

FIG. 10 illustrates gain of the right-handed S-band 2×2 antenna array on the antenna layer 20*b* of the antenna stack shown in the FIG. 8*d*, with a center frequency of 2.5 GHz. Table 3 shows some key measurement values in the FIG. 10. Measurement points m1 represents gain on the center frequency 2.5 GHz with θ=0 degrees and φ=0 degrees, and m3 and m4 represent approximate 3 dB points, which give a 3 dB bandwidth of about +/−18 degrees. Measurement point m2 illustrates gain with θ values deviating from 0 degrees. Port isolation calculated as a difference between measurement points m1 and m2 is about 35 dB.

TABLE 3

| Measurement point | Theta (θ) | Gain (dB) |
|---|---|---|
| m1 | 0.0 | 16.9 |
| m2 | 0.0 | −17.7 |
| m3 | 18.5 | 14.0 |
| m4 | −18.5 | 14.0 |

Figure 11:
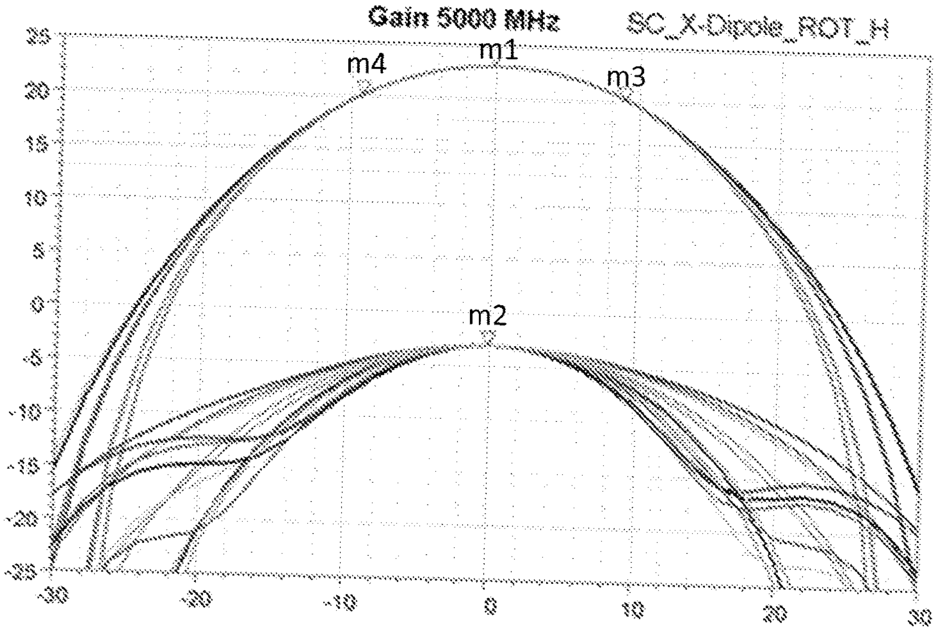
FIG. 11 illustrates gain in C-band

FIG. 11 illustrates gain of the left-handed C-band 4×4 antenna array on the antenna layer 20*a* of the antenna stack shown in the FIG. 8*d*, with a center frequency of 5 GHz. Table 4 shows some key measurement values in the FIG. 11. Measurement points m1 represents gain on the center frequency 5 GHz with θ=0 degrees and φ=0 degrees, and m3 and m4 represent approximate 3 dB points, which give a 3 dB bandwidth of about +/−9 degrees. Measurement point m2 illustrates gain with θ values deviating from 0 degrees. Port isolation calculated as a difference between measurement points m1 and m2 is about 26 dB.

TABLE 4

| Measurement point | Theta (θ) | Gain (dB) |
|---|---|---|
| m1 | 0.0 | 23.0 |
| m2 | 0.0 | −3.0 |
| m3 | 9.1 | 20.1 |
| m4 | −9.1 | 20.1 |

Figure 12:
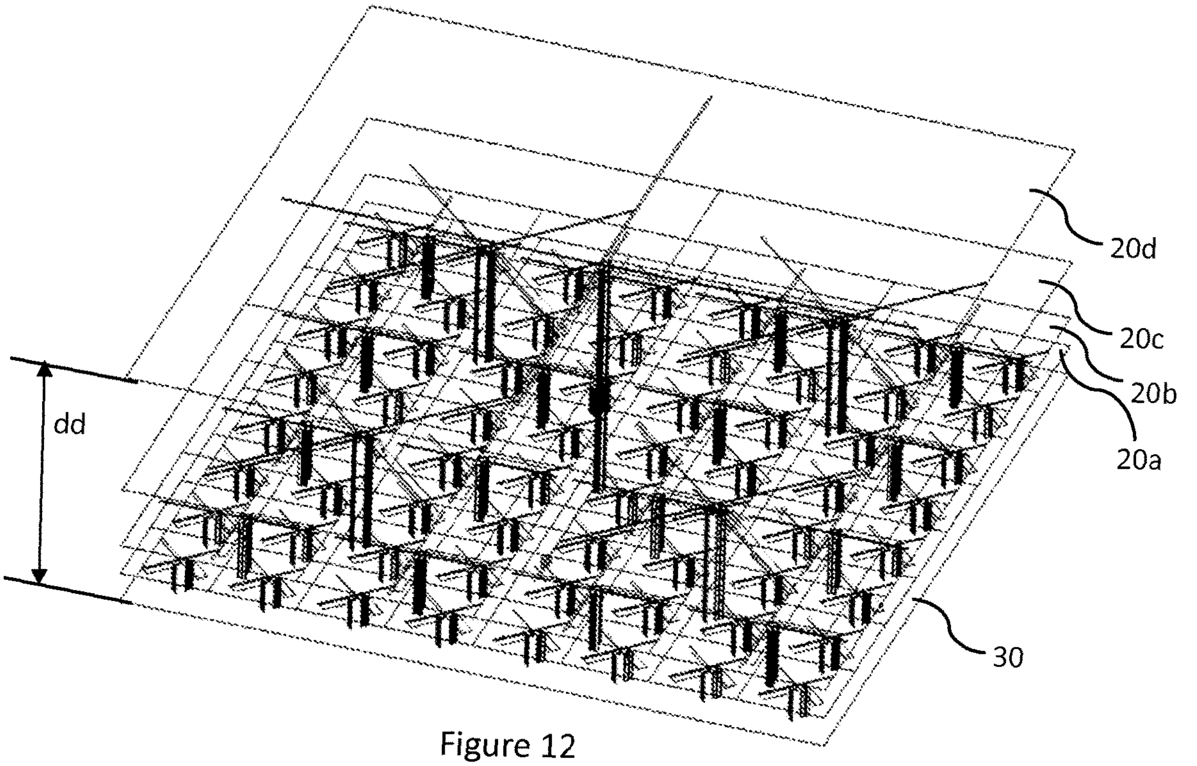
FIG. 12 illustrates structure of a second antenna stack

The FIG. 12 illustrates structure of an antenna stack according to a second embodiment of the present invention. Antenna elements are implemented using the first crossed dipole antenna element design, but alternatively, the second crossed dipole antenna element design may be used. This antenna stack covers four different frequency bands, namely UHF band with frequencies below 1 GHz (for example between 300 MHz and 1 GHz), L-band with frequencies between 1 and 2 GHz, S-band with frequencies between 2 and 4 GHz and C-band with frequencies between 4 and 8 GHz. Antenna layers 20*a*, 20*b* and 20*c* are arranged in a stack similar to the first embodiment, but have four times the size: the C-band antenna array has 8×8 antenna elements, the S-band antenna array has 4×4 antenna elements, the L-band antenna array has 2×2 antenna elements, and the whole stack is further superimposed by an antenna layer (20*d*) with a crossed dipole UHF antenna. Like in the first embodiment, antenna elements on any adjacent superimposed antenna layers have preferably a 45-degree angular displacement with respect of each other, in other words the antenna elements on adjacent layers are rotated with respect to each other as to enhance antenna isolation on adjacent layers. Exemplary, non-binding measures of the antenna design are following: the quarter-wave distances from the ground plane are about da=11 mm, db=22 mm, db=44 mm and dd=88 mm. Total lateral area of the antenna stack is for example 248×248 mm. For example, the UHF antenna may have a center frequency of 430 Mhz, with dipole arms of 325/2 mm.

Figure 13:
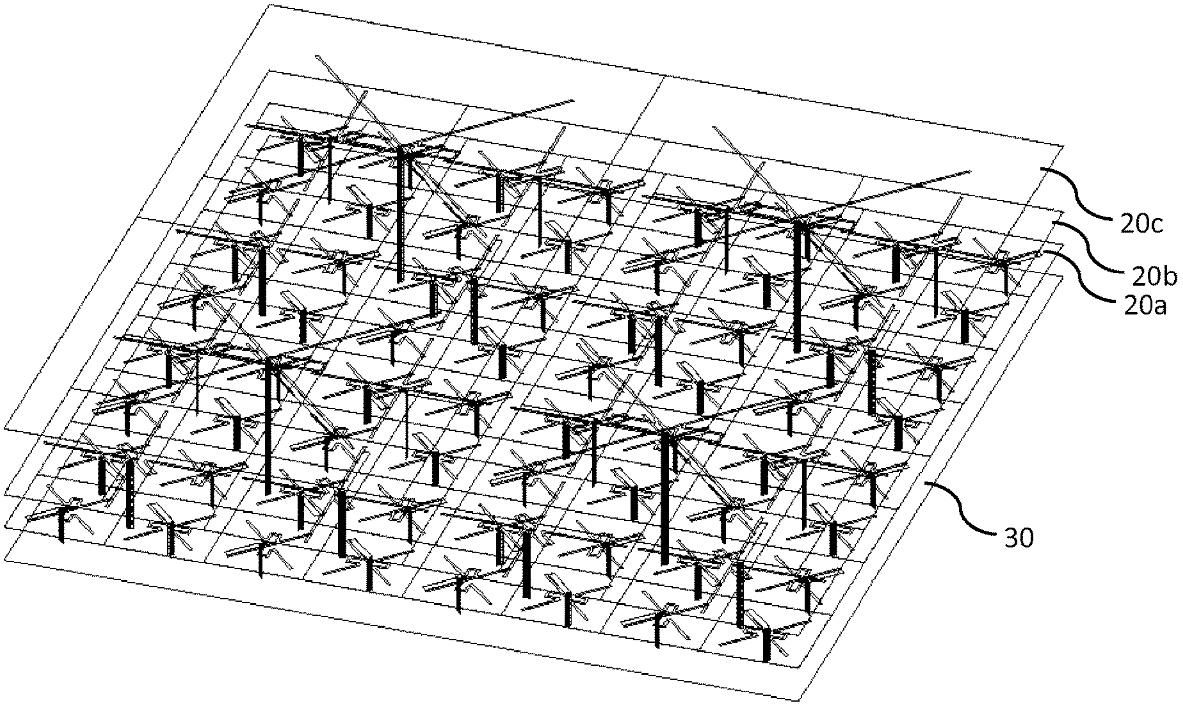
FIG. 13 illustrates structure of a third antenna stack

The FIG. 13 illustrates structure of an antenna stack according to a third embodiment of the present invention. Antenna elements are implemented using the second crossed dipole antenna element design, but alternatively, the first crossed dipole antenna element design may be used. This exemplary embodiment has a C-band antenna array with 8×8 antenna elements, a S-band antenna array with 4×4 antenna elements and a L-band antenna array with 2×2 antenna elements. Distances between the antenna layers (20*a*, 20*b*, 20*c*) and the ground plane (30) is preferably approximately equal to quarter wavelength of the center frequency of the antenna elements on the respective antenna layer.

It should be noticed that above given embodiments are not limiting, but any combination of number of superimposed antenna layers and first and/or second crossed dipole antenna element designs is applicable.

Preferably, orientation of the dipoles of the crossed dipole antenna elements on any two adjacent superimposed antenna layers has a 45-degree rotation with respect to antenna elements on the other antenna layer above and/or below. This reduces coupling between antennas on the superimposed antenna layers.

Figure 14:
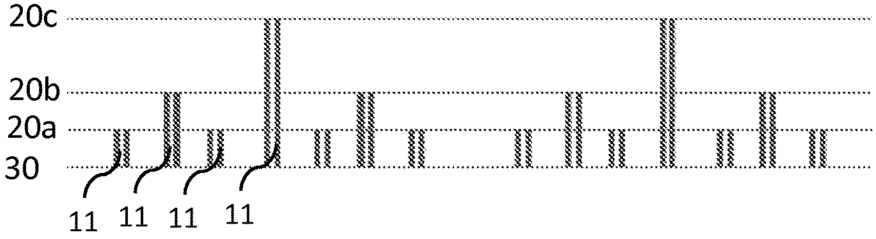
FIG. 14 illustrates a portion of a side view of the antenna stack

The FIG. 14 illustrates a portion of a side view of the antenna stack with the second crossed dipole antenna element design. Antenna layers (20*a*, 20*b*, 20*c*) are located on predefined distances from the ground plane (30). Two-wire antenna feeds (11) are arranged between ground plane (30) and the respective antenna layer. One of the wires is coupled to the ground, while the other wire carries the radio frequency signal towards the antenna. The same principle is applied to feeding the antenna elements of the first crossed dipole antenna element design, but each dipole has its own antenna feeds preferably extending from the respective antenna layer in vicinity of the center (the crossing) of the respective crossed dipole antenna element.

Figure 15A:
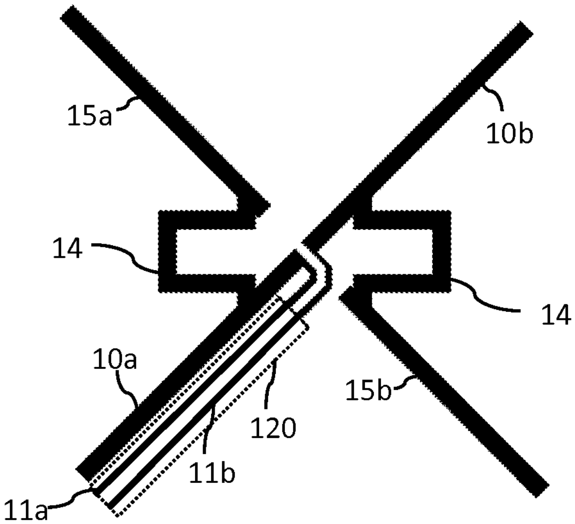
FIG. 15*a* illustrates top view a left-handed crossed dipole antenna element
Figure 15B:
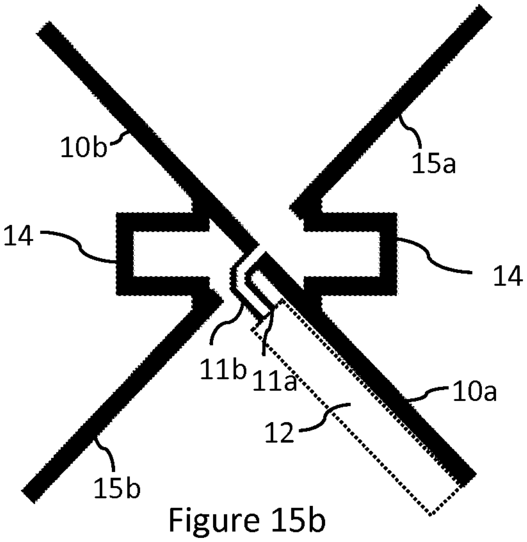
FIG. 15*b* illustrates top view a right-handed crossed dipole antenna element

The FIG. 15*a* illustrates top view a left-handed crossed dipole antenna element according to the second crossed dipole antenna element design and the FIG. 15*b* illustrates top view of a right-handed crossed dipole antenna element according to the second crossed dipole antenna element design. Signal feed (11*a*) is coupled to the primary feed arm (10*a*) of a first dipole, and the parasitic feed arm (10*b*) of the first dipole is electrically coupled to the ground (11*b*) via the other line of the antenna feed. Delay lines (14) couple arms (15*a*, 15*b*) of the second dipole to the first dipole, causing a 90-degree phase shift between the first dipole and second dipole. In the FIG. 15*a*, the antenna feeds (11*a*, 11*b*) are shown as manufactured on the insulation sheet, with outline of the partial cutout (120) with antenna feed lines marked with dashed line. The FIG. 15*b* shows the dipoles, portions of antenna feeds attached to the antenna on the antenna layer, and a cutout region (12) in the insulating sheet, after the antenna feeds (11*a*, 11*b*) have been bent towards the ground plane for coupling.

Figure 16:
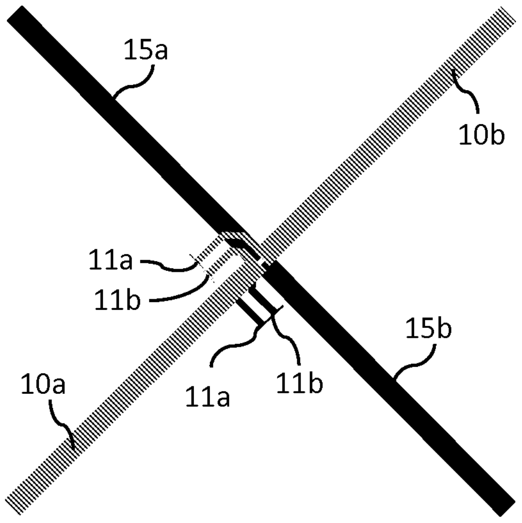
FIG. 16 illustrates top view a crossed dipole antenna element with two feeds

The FIG. 16 illustrates top view of a crossed dipole antenna element according to the first crossed dipole antenna element design. Two dipoles of are on different faces of the insulating sheet, and thus galvanically separated from each other by the insulating sheet, so that dipoles can be individually fed. Either arm (10*a*, 10*b*) of the first dipole on the top face of the insulating sheet can be used as the primary arm, while the other arm (10*b*, 10*a*) is used as the parasitic arm; configuration depends on which one of the lines (11*a*, 11*b*) of the antenna feed is coupled to RF signal and which to the ground plane. Likewise, either arm (15*a*, 15*b*) of the second dipole on the bottom face of the insulating sheet can be used as the primary arm, while the other arm (15*b*, 15*a*) is used as the parasitic arm.

Antennas and antenna arrays of the antenna stack may be operated in time division, so that only a single antenna or antenna operates at a time. Using time division reduces or eliminates interference between radio frequency signals transmitted and/or received by the antennas and antenna arrays.

Figure 17:
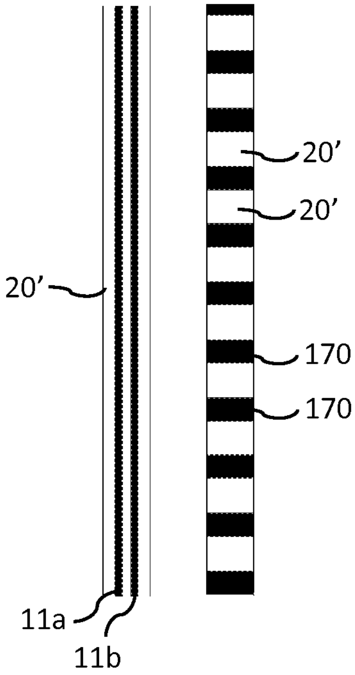
FIG. 17 illustrates the antenna feed portion with an impedance tuning ladder on back side.

The FIG. 17 illustrates two views of an antenna feed line extending from antenna to ground plane. On the left, a view on a first face is shown with the antenna feed comprising an RF-line (11*a*) and a ground line (11*b*), which are formed on a first face of the feed portion (20') of the sheet of insulating material that is partially cut out from the respective antenna layer and bent towards the ground plane. Partial cutout refers to that a portion of the circumference of the feed portion that comprises the ends of the RF-line (11*a*) and ground line (11*b*) that are coupled to the antenna is not cut, thus remaining coupled to the respective antenna layer and the respective dipole antenna element or elements therein. The RF-line (11*a*) is connected to RF-signal while the ground line (11*b*) is short-circuited to ground. As the antenna feed line is roughly quarter wave long, corresponding to a 90 degree phase shift, it is a quarter wave impedance transformer between the antenna and a radio frequency signal feed. Impedance level of the antenna feed line can be adjusted by a plurality of conducting patches (170) manufactured on the second face of the feed portion (20'), shown in the FIG. 17 on the right side, thus increasing capacitance between the RF-line (11*a*) and the ground line (11*b*). This kind of structure is referred to as an impedance tuning ladder. The quarter wavelength antenna feed can behave as a monopole antenna deteriorating dipole polarization purity. However, the conducting patches (170) can be used to deprive such undesired feed line resonance. Instead of separate patches, the second face of the feed portion (20') may comprise a contiguous ground pattern.

The antenna stack has primarily been designed in view of satellite use, in which it should be foldable and/or rollable to enable transporting the antenna in the limited available volume. A support structure and/or a substrate structure may be provided between the antenna layers that enables and facilitates folding and/or rolling the antenna stack and also unfolding and/or unrolling the antenna stack into an operation position. Any volume between the antenna layers that is not occupied with the optional support structure and/or substrate material is then filled with gas, such as air, or is in vacuum when the antenna is in operation position.

The antenna stack according to the invention may also be used in applications that do not necessarily require fitting the antenna into a small volume during transport or when not in use. In such case, volume between the antenna layers may be partially or fully filled with a support structure and/or a substrate that does not enable folding and/or rolling the antenna stack.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. An antenna stack comprising a ground plane and a plurality of antenna layers comprising i) an antenna on one antenna layer and at least one antenna array on at least one different antenna layer or ii) at least two antenna arrays, each on a different antenna layer, wherein each individual antenna layer comprises an antenna or an antenna array that operates on a frequency band that is specific to the respective antenna layer and different from frequency band or bands of other antenna layer or layers;

wherein each antenna layer has a predefined distance from the ground plane, wherein the predefined distance between the antenna or antenna array comprised on the respective antenna layer and the ground plane is defined based of the frequency band of the respective antenna or antenna array;

wherein the antenna layer comprises antenna elements manufactured by patterning conductor material on a respective flexible and/or bendable sheet of insulating material; and wherein each antenna element on the respective antenna layer is a circularly polarized crossed dipole antenna element or a crossed dipole antenna element that is electrically configurable into any one of a circularly polarized configuration and linearly polarized configuration by feeding a single dipole antenna element of the crossed dipole antenna element to cause a single linearly polarized configuration, by feeding both dipole antenna elements of the crossed dipole antenna element separately to cause a dual linearly polarized configuration, and by feeding dipole antenna elements of the crossed dipole antenna element with a 90-degree phase difference to cause a circular polarization.

2. The antenna stack according to claim 1, wherein all antenna elements comprised on the same antenna layer are mutually similar.

3. The antenna stack according to claim 1, wherein the antenna layers are separated from each other by a non-zero distance and wherein the volume between superimposed antenna layers is filled by a gas, vacuum and/or any supporting structure and/or substrate.

4. The antenna stack according to claim 1, wherein each antenna element is fed by a respective antenna feed patterned on a feed portion of the respective sheet of insulating material, the feed portion comprising a conductor material pattern forming two antenna feed lines (11*a*, 11*b*) on a first face of the feed portion, wherein the feed portion is partially cut out from the respective flexible and/or bendable sheet of insulating material of the respective antenna layer and wherein one of the antenna feed lines is attached to the ground plane and other one of the antenna feed lines is coupled to a radio frequency signal feed on the ground plane.

5. The antenna stack according to claim 4, wherein the feed portion further comprises a contiguous ground layer or a plurality of conductive patches formed on a second face of the feed portion that is opposite to the first face of the feed portion.

6. The antenna stack according to claim 1, wherein a/the antenna feed/feeds of an antenna layer that is/are not directly superimposed on the ground plane passes/pass through respective sheet or sheets of insulating material of any intermediate antenna layers, to reach the ground plane.

7. The antenna stack according to claim 1, wherein the antenna arrays are arranged according to increasing wavelength, shortest wavelength closest to the ground plane and longest wavelength furthest away from the ground plane.

8. The antenna stack according to claim 1, wherein distance between the ground plane and each antenna layer is equal or comparable to quarter of the wavelength of the center frequency of the antenna elements on the respective antenna layer.

9. The antenna stack according to claim 1, wherein the antenna layers are parallel with the ground plane.

10. The antenna stack according to claim 1, wherein dipole antenna elements on each two adjacent superimposed antenna layers are rotated 45 degrees with respect to each other.

11. The antenna stack according to claim 1, wherein each antenna element of the respective antenna or antenna array comprises:

a crossed dipole antenna element comprising two electrically separate, mutually crossed dipoles on two opposite faces of the sheet of insulating material and two antenna feeds for individually feeding the two dipoles, wherein the crossed dipole antenna element is configurable into a circularly polarized antenna by feeding the two crossed dipoles with a 90 degree phase difference and the crossed dipole antenna element is configurable into a linearly polarized configuration by feeding the two crossed dipoles separately to obtain dual linear polarization, or feeding just one of the crossed dipoles for single linear polarization; or a circularly polarized crossed dipole antenna element comprising two mutually crossed dipoles on the same face of the sheet of insulating material and a single antenna feed, wherein a first dipole is directly coupled to the antenna feed and the second dipole is coupled to the antenna feed via phasing connection lines formed on the respective antenna layer for causing the respective second dipole to be fed in 90 degrees phase with respect to the first dipole.

12. The antenna stack according to claim 1, wherein the antennas or antenna arrays on different antenna layers are configured to be used in time division, so that the antenna or the antenna array on a single antenna layer is active at a time.

13. The antenna stack according to claim 1, wherein the at least two different frequency bands are selected from:

UHF band with frequency band below 1 GHZ,

L-band with frequency band between 1 and 2 GHZ,

S-band with frequency band between 2 and 4 GHZ,

C-band with frequency band between 4 and 8 GHz.

14. The antenna stack according to claim 1, wherein a relation between center frequencies of antenna or antenna array on two superimposed antenna layers is approximately 1:2, so that the center frequency of the antenna layer that that is closer to the ground plane is higher.

15. The antenna stack according to claim 1, wherein the antenna stack is foldable and/or rollable for transport and unfoldable and/or unrollable for operation.

16. Use of an antenna stack according to claim 1 in a satellite.

17. An antenna stack comprising a ground plane and a plurality of antenna layers comprising i) an antenna on one antenna layer and at least one antenna array on at least one different antenna layer or ii) at least two antenna arrays, each on a different antenna layer, wherein each individual antenna layer comprises an antenna or an antenna array that operates on a frequency band that is specific to the respective antenna layer and different from frequency band or bands of other antenna layer or layers;

wherein each antenna layer has a predefined distance from the ground plane, wherein the predefined distance between the antenna or antenna array comprised on the respective antenna layer and the ground plane is defined based of the frequency band of the respective antenna or antenna array;

wherein the antenna layer comprises antenna elements manufactured by patterning conductor material on a respective flexible and/or bendable sheet of insulating material; and wherein each antenna element on the respective antenna layer is a circularly polarized crossed dipole antenna element or a crossed dipole antenna element that is electrically configurable into a circularly polarized configuration or linearly polarized configuration by feeding a single dipole antenna element of the crossed dipole antenna element to cause a single linearly polarized configuration, by feeding both dipole antenna elements of the crossed dipole antenna element separately to cause a dual linearly polarized configuration, or by feeding dipole antenna elements of the crossed dipole antenna element with a 90-degree phase difference to cause a circular polarization, wherein each antenna element is fed by a respective antenna feed patterned on a feed portion of the respective sheet of insulating material, the feed portion comprising a conductor material pattern forming two antenna feed lines (11*a*, 11*b*) on a first face of the feed portion, wherein the feed portion is partially cut out from the respective flexible and/or bendable sheet of insulating material of the respective antenna layer and wherein one of the antenna feed lines is attached to the ground plane and other one of the antenna feed lines is coupled to a radio frequency signal feed on the ground plane.

18. The antenna stack according to claim 17, wherein the feed portion further comprises a contiguous ground layer or a plurality of conductive patches formed on a second face of the feed portion that is opposite to the first face of the feed portion.

19. An antenna stack comprising a ground plane and a plurality of antenna layers comprising i) an antenna on one antenna layer and at least one antenna array on at least one different antenna layer or ii) at least two antenna arrays, each on a different antenna layer, wherein each individual antenna layer comprises an antenna or an antenna array that operates on a frequency band that is specific to the respective antenna layer and different from frequency band or bands of other antenna layer or layers;

wherein each antenna layer has a predefined distance from the ground plane, wherein the predefined distance between the antenna or antenna array comprised on the respective antenna layer and the ground plane is defined based of the frequency band of the respective antenna or antenna array;

wherein the antenna layer comprises antenna elements manufactured by patterning conductor material on a respective flexible and/or bendable sheet of insulating material; and wherein each antenna element on the respective antenna layer is a circularly polarized crossed dipole antenna element or a crossed dipole antenna element that is electrically configurable into a circularly polarized configuration or linearly polarized configuration by feeding a single dipole antenna element of the crossed dipole antenna element to cause a single linearly polarized configuration, by feeding both dipole antenna elements of the crossed dipole antenna element separately to cause a dual linearly polarized configuration, or by feeding dipole antenna elements of the crossed dipole antenna element with a 90-degree phase difference to cause a circular polarization, wherein dipole antenna elements on each two adjacent superimposed antenna layers are rotated 45 degrees with respect to each other.

* * * * *